United States Patent
Jain et al.

(10) Patent No.: US 9,626,435 B2
(45) Date of Patent: Apr. 18, 2017

(54) USING HIERARCHICAL SCORING FOR DISAMBIGUATION IN AN INFORMATION RETRIEVAL SYSTEM

(71) Applicant: Google Inc., Mountain View, CA (US)

(72) Inventors: Ankit Jain, Milpitas, CA (US); Abhinav Khandelwal, Maharashtra (IN)

(73) Assignee: GOOGLE INC., Mountain View, CA (US)

( * ) Notice: Subject to any disclaimer, the term of this patent is extended or adjusted under 35 U.S.C. 154(b) by 680 days.

(21) Appl. No.: 13/679,033

(22) Filed: Nov. 16, 2012

(65) Prior Publication Data

US 2014/0143238 A1 May 22, 2014

(51) Int. Cl.
*G06F 17/30* (2006.01)
(52) U.S. Cl.
CPC .............................. *G06F 17/30749* (2013.01)
(58) Field of Classification Search
CPC ..................... G06F 17/30749; G06F 17/30752
See application file for complete search history.

(56) References Cited

U.S. PATENT DOCUMENTS

| | | | |
|---|---|---|---|
| 7,860,886 B2 | 12/2010 | Loftesness | |
| 8,122,013 B1 | 2/2012 | Qian et al. | |
| 8,364,669 B1 * | 1/2013 | Chowdhury et al. | 707/726 |
| 8,843,500 B2 * | 9/2014 | Nogues | G06F 17/30749 707/726 |
| 2009/0055385 A1 | 2/2009 | Jeon et al. | |
| 2010/0121857 A1 | 5/2010 | Elmore et al. | |
| 2011/0137920 A1 * | 6/2011 | Cohen | G06Q 10/04 707/748 |
| 2012/0096011 A1 | 4/2012 | Kay et al. | |

FOREIGN PATENT DOCUMENTS

| | | |
|---|---|---|
| EP | 2228739 A2 | 9/2010 |
| WO | 2011035409 A1 | 3/2011 |

OTHER PUBLICATIONS

International Search Report and Written Opinion in PCT/US2013/069100 mailed Jul. 18, 2014.
Knees, Peter, et al., "A Music Search Engine Built Upon Audio-based and Web-based Similarity Measures".

* cited by examiner

*Primary Examiner* — Kris Andersen
(74) *Attorney, Agent, or Firm* — Morris & Kamlay LLP (57) ABSTRACT

A method for retrieving information may include receiving, in a non-World Wide Web (WWW) corpus, a search query for a media author. Search results for the search query may be identified within the non-WWW corpus. A score for each of a plurality of media authors identified in the search results may be generated. The score for a corresponding one of the plurality of media authors may be based on a combined media popularity score for a plurality of media items authored by the corresponding one of the plurality of media authors. The search results may be ranked based on the generated score for each of the plurality of media authors.

18 Claims, 5 Drawing Sheets

USING HIERARCHICAL SCORING FOR DISAMBIGUATION IN AN INFORMATION RETRIEVAL SYSTEM

TECHNICAL FIELD

Aspects of the present application relate generally to the field of data searching. More specifically, certain implementations of the present disclosure relate to using hierarchical scoring for disambiguation in an information retrieval system.

BACKGROUND

An information retrieval system uses terms and phrases to index, retrieve, organize and describe documents. When a user enters a search query, the terms in the query are identified and used to retrieve documents from the information retrieval system, and then rank them. However, in sparse information retrieval systems, such as music search engines, there is often not enough data per document to distinguish documents from each other. Consequently, searches in such sparse information retrieval systems may result in ambiguous scoring of the documents associated with the search terms and phrases, which leads to poor ranking of the search results.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for using hierarchical scoring for disambiguation in an information retrieval system, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method for retrieving information may include receiving, in a non-World Wide Web (WWW) corpus, a search query for a media author. The media may be, for example, printed media (e.g., books), music, movies, and other multimedia items. Search results for the search query may be identified within the non-WWW corpus. A score may be generated for each of a plurality of media authors identified in the search results. The score for a corresponding one of the plurality of media authors may be based on a combined media popularity score for a plurality of media items authored by the corresponding one of the plurality of media authors. The search results may be ranked based on the generated score for each of the plurality of media authors.

In accordance with an example embodiment of the disclosure, a method for retrieving information may include receiving a search query for a music artist, and identifying search results for the search query. A score for each of a plurality of music artists identified in the search results may be generated. The score for a corresponding one of the plurality of music artists may be based on a combined music album popularity score for a plurality of music albums of the corresponding one of the plurality of music artists. The search results may be ranked based on the generated score for each of the plurality of music artists. Identifying information for the plurality of music albums and identifying information for a plurality of music tracks within each of the plurality of music albums may be received. A popularity score for each of the plurality of music tracks may be determined. The popularity score for a given music track may be based on one or both of a total number of search queries for the music track and clickthrough ratios (CTRs) of web results from the search queries. At least a portion of the total number of search queries for the music track may be performed in a World Wide Web (WWW)-based search corpus.

A popularity score for each of the plurality of music albums may be determined. A popularity score for a music album may be based on a weighted average of the popularity score for each of the plurality of music tracks within the music album. The combined music album popularity score may be generated as a weighted average of the popularity score for each of the plurality of music albums. The score for the corresponding one of the plurality of music artists may be further based on at least one score independent of the search query. The at least one score independent of the search query may be based on one or more of a geographic location the search query is received from, a release date of at least one of the plurality of music albums, a play count of at least one of the plurality of music albums, and a sell count of at least one of the plurality of music albums.

In accordance with another example embodiment of the disclosure, a system for retrieving information may include a network device. The network device may be operable to receive a search query for a music artist and identify search results for the search query. A score for each of a plurality of music artists identified in the search results may be generated. The score for a corresponding one of the plurality of music artists may be based on a combined music album popularity score for a plurality of music albums of the corresponding one of the plurality of music artists. The search results may be ranked based on the generated score for each of the plurality of music artists.

The network device may be operable to receive identifying information for the plurality of music albums and identifying information for a plurality of music tracks within each of the plurality of music albums. The network device may be operable to determine a popularity score for each of the plurality of music tracks. A popularity score for a music track may be based on one or both of a total number of search queries for the music track and clickthrough ratios (CTRs) of web results from the search queries. At least a portion of the total number of search queries for the music track may be performed in a World Wide Web (WWW)-based search corpus. The network device may be operable to determine a popularity score for each of the plurality of music albums. A popularity score for a music album may be based on a weighted average of the popularity score for each of the plurality of music tracks within the music album.

The network device may be operable to generate the combined music album popularity score as a weighted average of the popularity score for each of the plurality of music albums. The score for the corresponding one of the plurality of music artists may be further based on at least one score independent of the search query. The at least one score independent of the search query may be based on one or more of a geographic location the search query is received from, a release date of at least one of the plurality of music albums, a play count of at least one of the plurality of music albums, and a sell count of at least one of the plurality of music albums.

In accordance with yet another example embodiment of the disclosure, a method for retrieving information may include receiving a search query for a music album and identifying search results for the search query. A score for each of a plurality of music albums identified in the search results may be generated. The score for a corresponding one of the plurality of music albums may be based on one or both of a music track popularity score for at least one music track from the corresponding one of the plurality of music albums, and a music artist popularity score for a music artist associated with the corresponding one of the plurality of music albums. The search results may be ranked based on the generated score for each of the plurality of music albums.

In accordance with yet another example embodiment of the disclosure, a method for retrieving information may include receiving a search query for a music track and identifying search results for the search query. A score for each of a plurality of music tracks identified in the search results may be generated. The score for a corresponding one of the plurality of music tracks may be based on one or both of a music album popularity score for at least one music album associated with the corresponding one of the plurality of music tracks, and a music artist popularity score for a music artist associated with the corresponding one of the plurality of music tracks. The search results may be ranked based on the generated score for each of the plurality of music tracks.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "e.g.," introduces a list of one or more non-limiting examples, instances, or illustrations. As used herein, the term "corpus" (plural, "corpora") means a collection of documents (or data items) of a given type. The term "World Wide Web (WWW) corpus" means a corpus where the corpus documents (or data items) are available on the World Wide Web. The term "non-WWW corpus" means a corpus where the corpus documents (or data items) are not available on the WWW.

The present disclosure relates to a method and system for using hierarchical scoring for disambiguation in an information retrieval system. In various implementations, a user search query may be received in a sparse information retrieval system, such as a music search engine or any other information retrieval system. Since there may be limited data available in certain search categories (e.g., artists, albums, and tracks), seemingly similar documents from one category may be further distinguished from each other (and ranked), by using ranking signals of related documents (e.g., documents in related categories). For example, in order to disambiguate two documents about musical artists with the same name, signals about their respective musical albums may be used, as well as signals about the tracks within those albums, in order to distinguish the two artists.

One such signal that may be used is the popularity of a musical item (e.g., how many search queries have been previously received within the information retrieval system about the music item, as well as clickthrough ratios of the web results for such search queries). For example, a weighted aggregate of track popularities in a given album may be used in computing the score for the album at query time, as well as the score for the artist who has recorded the given track. Similarly, a weighted aggregate of album popularities may be used to compute the score for the artist who recorded the album. In this regard, hierarchical aggregation of popularity scores of related documents may be used to rank similar looking documents in order of their relative popularity.

For example, a method for retrieving information may include receiving a search query for a music artist, and identifying search results for the search query. A score for each of a plurality of music artists identified in the search results may be generated. The score for a corresponding one of the plurality of music artists may be based on a combined music album popularity score for a plurality of music albums of the corresponding one of the plurality of music artists. The search results may be ranked based on the generated score for each of the plurality of music artists. Identifying information for the plurality of music albums and identifying information for a plurality of music tracks within each of the plurality of music albums may be received. A popularity score for each of the plurality of music tracks may be determined. The popularity score for a given music track may be based on a total number of search queries for the music track. At least a portion of the total number of search queries for the music track may be performed in a World Wide Web (WWW)-based search corpus. As used herein, the term "WWW-based search corpus" is meant to include all documents available on the Internet (i.e., including, but not limited to, music-related documents).

Figure 1A:
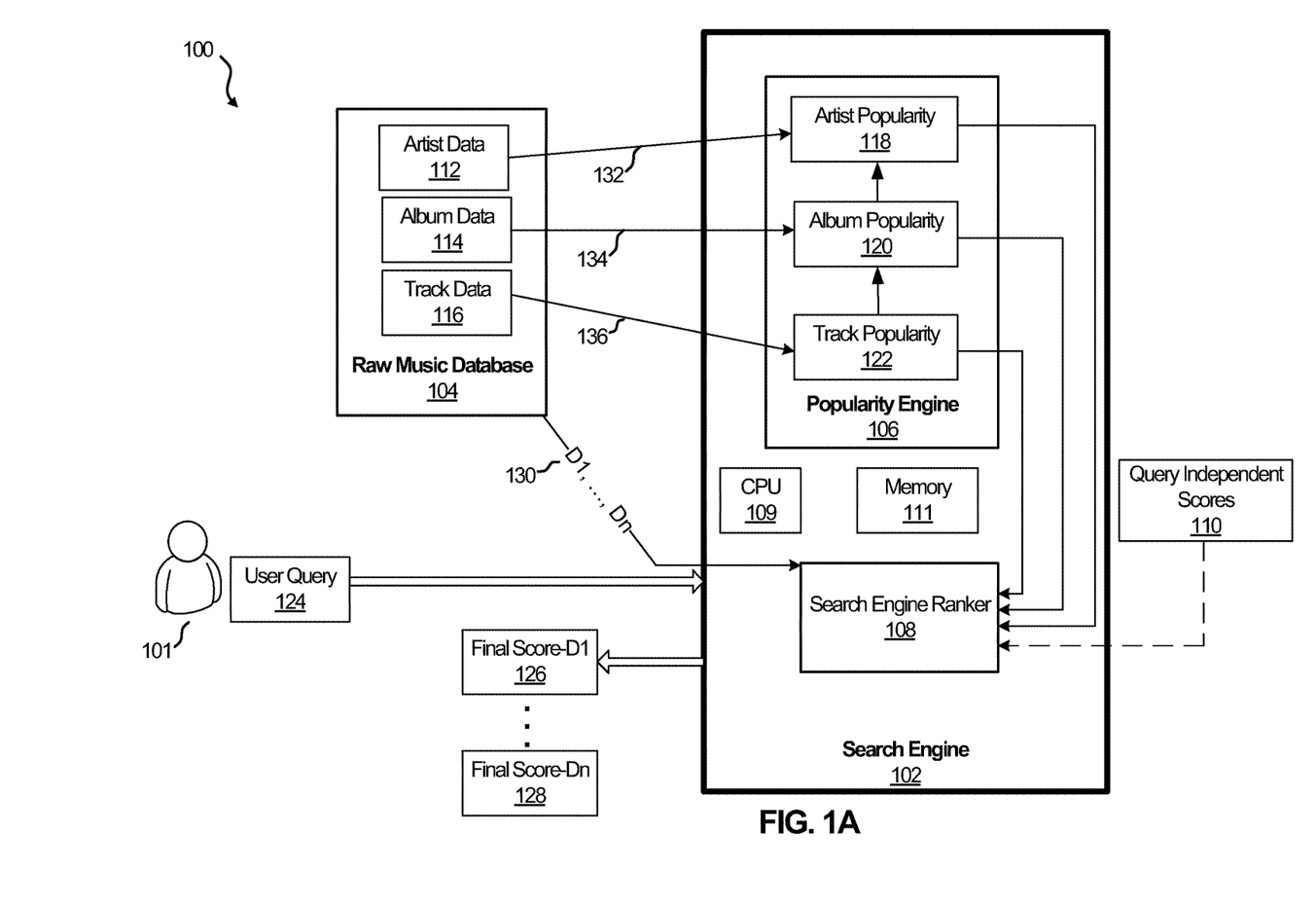
FIG. 1A is a block diagram illustrating an example information retrieval system, in accordance with an embodiment of the disclosure.

FIG. 1A is a block diagram illustrating an example information retrieval system, in accordance with an embodiment of the disclosure. Referring to FIG. 1A, the example information retrieval system 100 may comprise a search engine 102 and a raw music database 104.

The raw music database 104 may comprise suitable circuitry, logic and/or code and may be operable to provide raw music-related data to the search engine 102. The raw music database 104 may comprise artist data module 112, album data module 114, and track data module 116. The artist data module 112 may comprise suitable circuitry, logic and/or code and may be operable to provide raw data about music artists (e.g., identification and biographic data). The album data module 114 may comprise suitable circuitry, logic and/or code and may be operable to provide raw data about music albums (e.g., album identification information, release date, etc.). The track data module 116 may comprise suitable circuitry, logic and/or code and may be operable to provide raw data about music tracks within a given album (e.g., number of tracks in an album, track names, track duration, etc.).

The search engine 102 may comprise suitable circuitry, logic and/or code and may be operable to receive raw music-related data (e.g., documents 130, D1, . . . , Dn) in response to user query 124, and rank the received documents 130 based on the document final scores 126, . . . , 128. The search engine 102 may comprise a popularity engine 106, a search engine ranker 108, a CPU 109 and memory 111. The CPU 109 may be operable to perform one or more of the processing functionalities associated with retrieving of information, as disclosed herein.

The popularity engine 106 may comprise suitable circuitry, logic and/or code and may be operable to calculate a popularity score for one or more categories of documents received from the raw music database 104. More specifically, the popularity engine 106 may comprise an artist popularity module 118, an album popularity module 120, and a track popularity module 122.

The track popularity module 122 may comprise suitable circuitry, logic and/or code and may be operable to receive music track-related data from the track data module 116 via the communication link 136. The track popularity module 122 may then calculate a popularity score for a given track. For example, the track popularity score may be based on the number of search queries previously received within the information retrieval system 100 (or within a World Wide Web-based information corpus) about the specific music track, as well as on clickthrough ratios (CTRs) of web page results from the search queries.

The album popularity module 120 may comprise suitable circuitry, logic and/or code and may be operable to receive album-related data from the album data module 114 via the communication link 134. The album popularity module 120 may then calculate a popularity score for a given album. The album popularity score may be based on a popularity score of a given album and/or a weighted average of the popularity scores of the individual tracks within the album (the popularity scores for the individual tracks may be obtained from the track popularity module 122). The popularity score for an album may be based on the number of search queries previously received within the information retrieval system 100 (or within a World Wide Web based information corpus) about the specific music album.

The artist popularity module 118 may comprise suitable circuitry, logic and/or code and may be operable to receive artist-related data from the artist data module 112 via the communication link 132. The artist popularity module 118 may then calculate a popularity score for a given artist. The artist popularity score may be based on a popularity score of a given artist and/or a weighted average of the popularity scores of the albums (the popularity scores for the individual albums may be obtained from the album popularity module 120). The popularity score for an artist may be based on the number of search queries previously received within the information retrieval system 100 (or within a World Wide Web based information corpus) about the specific music artist.

Even though the popularity engine 106 is illustrated as implemented within the search engine 102, the present disclosure may not be limited in this regard. More specifically, the popularity engine 106 may be implemented separately from the search engine 102.

The search engine ranker 108 may comprise suitable circuitry, logic and/or code and may be operable to receive one or more documents 130 (e.g., documents D1, . . . , Dn) in response to a user query 124. The search engine ranker 108 may then rank the received documents 130 based on a final ranking score 126, . . . , 128 calculated for each document using one or more popularity scores received from the popularity engine 106, in combination with other query-independent features and signals.

In accordance with an example embodiment of the disclosure, the information retrieval system 100 may also comprise a query independent scores module 110. The query independent score module 110 may comprise suitable circuitry, logic and/or code and may be used to communicate one or more query independent scores for a given document, which may be used by the search engine ranker 108 to generate the final ranking scores 126, . . . , 128 of documents D1, . . . , Dn.

In operation, a user 101 may send a user query 124 to the search engine 102. The user query 124 may be, for example, a query about a music track, a music album, or a music artist. After the search engine 102 receives the user query 124, the search engine 102 may obtain one or more documents 130 (D1, . . . , Dn) that satisfy the user query 124.

For example, if the user query 124 is a query about a music track, the raw music database 104 may use track data module 116 and communicate track-related documents 130, which satisfy the user query 124 (e.g., if the query is about a specific song title, the returned documents 130 may be information on songs with the same title but taken from various albums and/or music artists). After the search engine 102 receives the documents 130, a popularity score may be calculated for each of the documents, and the popularity score may be used to calculate the final ranking scores 126, . . . , 128 for the documents and output a ranked search results list to the user 101. More detailed explanation of calculating the popularity scores (as one kind of query-independent score) for artist-, album-, or track-related searches is provided herein below in reference to FIGS. 2-4.

Even though the search engine 102, the raw music database 104 and the query independent scores module 110 are illustrated as separate blocks, the present disclosure may not be limited in this regard. More specifically, the raw music database 104 and the query independent scores module 110 may be part of, and implemented within, the search engine 102.

Additionally, even though the sparse information retrieval system 100 is implemented as music-related information retrieval system (e.g., the search engine 102 is a music search engine), other types of information retrieval systems may also be implemented in similar fashion. In accordance with an example embodiment of the disclosure, the database 104 may be books- (or printed media-) related database (or any other type of media-related database). The search engine 102 may then use a popularity engine 106 to calculate popularity scores and rank various categories of documents available from the raw database 104, in response to a user search query 124. Furthermore, the information retrieval system 100 (including the search engine 102 may be implemented) in one or more network devices.

Figure 1B:
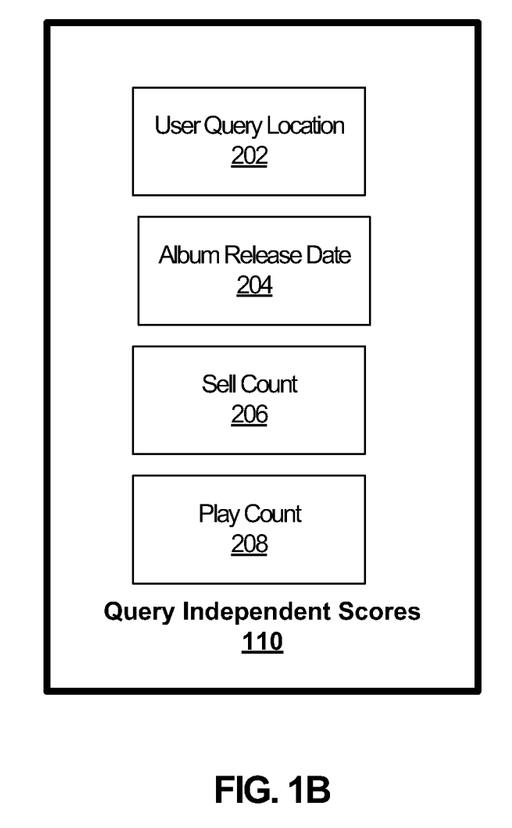
FIG. 1B is a block diagram of an example implementation of a query independent scores module, in accordance with an example embodiment of the disclosure.

FIG. 1B is a block diagram of an example implementation of a query independent scores module, in accordance with an example embodiment of the disclosure. Referring to FIG. 1B, the query independent scores module 110 may comprise suitable circuitry, logic and/or code and may be used to communicate one or more query independent scores for a given document, which may be used by the search engine ranker 108 to generate the final ranking scores 126, . . . , 128 of documents D1, . . . , Dn. More specifically, the query independent scores module 110 may comprise a user query location module 202, an album release data module 204, a sell count module 206, and a play count module 208.

Each of the modules 202-208 may comprise suitable circuitry, logic and/or code and may be operable to provide user query location information, album release data information, sell count information, or play count information, respectively, to the search engine ranker 108 for purposes of increasing the total ranking score of a given document. For example, if the user query 124 is about a specific music track by a given artist, the raw music database may locate and return back to the search engine 102 two tracks with the desired title and by the desired artist (e.g., the artist may have released the same song in 2 different languages, for two different geographic markets). The popularity scores returned by the popularity engine 106 may be the same for both tracks (the same album and the same artist may result in the same total popularity score after the album and artist popularity scores are compounded for each track). In this instance, the user query location module 202 may be used to communicate the geographic location of the user query 124 (e.g., the location may be obtained based on the IP address of the user 101 sending the search query 124). If the geographic location is the same as one of the two geographic markets intended by the two versions of the song, then the track recorded in the same language as the language of the geographic location the user query 124 was received from may be given an additional score and, therefore, ranked higher in the final ranking score list 126, . . . , 128.

Even though only four query independent scores 202-208 are listed with regard to the query independent score module 110, the present disclosure is not limiting in this regard, and other query independent scores may also be utilized by the search engine 102 in generating the final ranking scores 126, . . . , 128.

Figure 2:
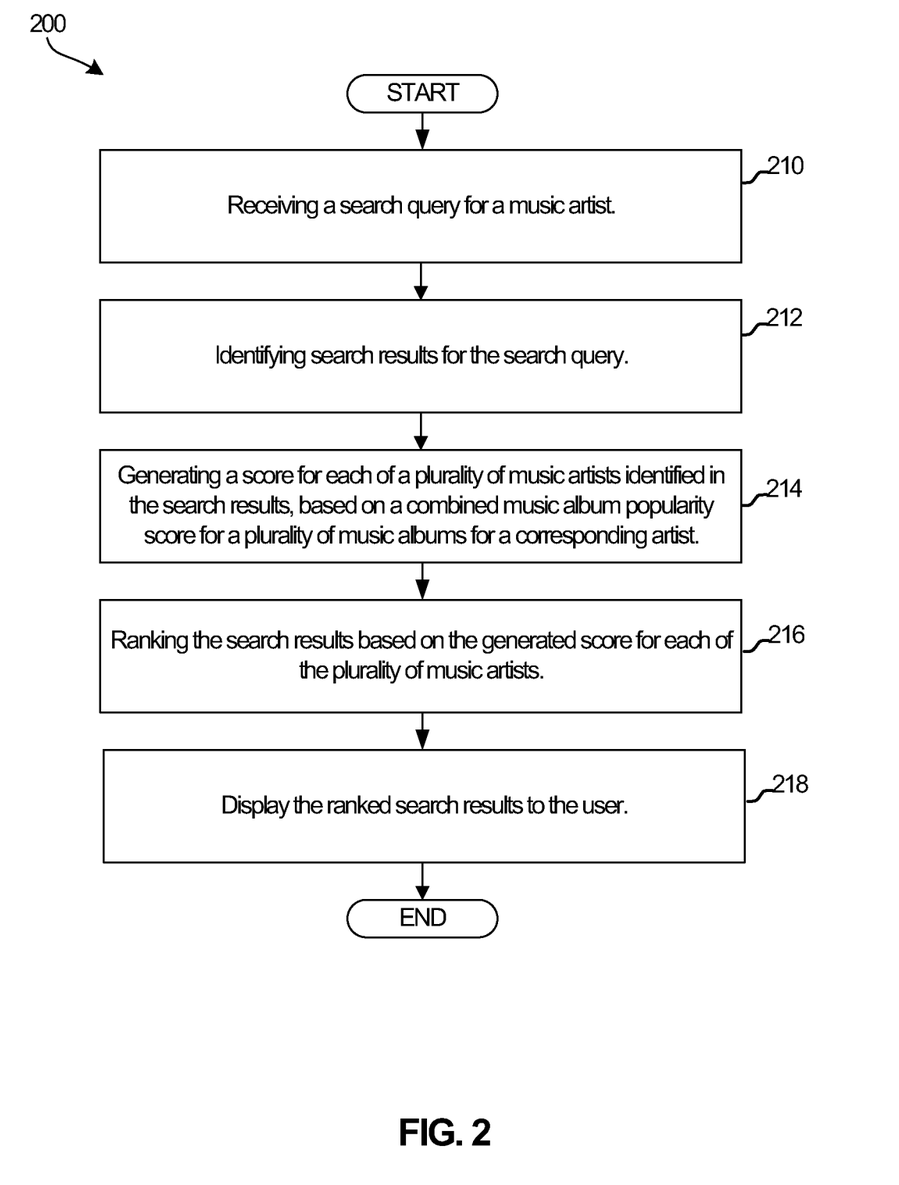
FIG. 2 is a flow chart illustrating example steps of a method for retrieving information in response to a search query for a music artist, in accordance with an example embodiment of the disclosure.

FIG. 2 is a flow chart illustrating example steps of a method for retrieving information in response to a search query for a music artist, in accordance with an example embodiment of the disclosure. Referring to FIGS. 1A-2, the example method 200 may start at 210 when the search engine 102 may receive a search query 124 for a music artist. At 212, the search engine 102 may use the raw music database 104 to identifying search results for the search query. More specifically, artist-related data (e.g., documents D1, . . . , Dn) may be identified as the search results (using the artist data module 112) and communicated to the search engine ranker 108.

At 214, the search engine 102 may generate a ranking score (e.g., 126, . . . , 128) for each of a plurality of music artists identified in the search results (e.g., documents 130), based on a combined music album popularity score for a plurality of music albums for a corresponding artist. More specifically, the search query 124 may be for a specific artist name. The returned search results (e.g., documents 130) may identify a plurality of different artists with the same or similar name as in the search query 124.

For each of the artists in the search results, the popularity engine 106 may obtain album information from the album data module 114, and track information for each album from the track data module 116. Subsequently, for a given artist, an album popularity score may be calculated by the album popularity module 120, based on a popularity score for the album and/or based on a weighted average of track popularity scores for all tracks within the album (the track popularity scores for all tracks within the given album may be received from the track popularity module 122). The album popularity score may be calculated by the album popularity module 120 for each music album of the given music artist. A combined music album popularity score may then be calculated by the album popularity module 120 based on the calculated album popularity score of the albums identified as being created by the given artist. An artist popularity score may be calculated by the artist popularity module 118 based on the combined music album popularity score received from the album popularity module 120.

At 216, the search results 130 may be ranked based on the final ranking scores 126, . . . , 128 of the search results (e.g., documents D1, . . . , Dn) generated by the search engine 102. At 218, the ranked search results may be displayed to the user 101.

Figure 3:
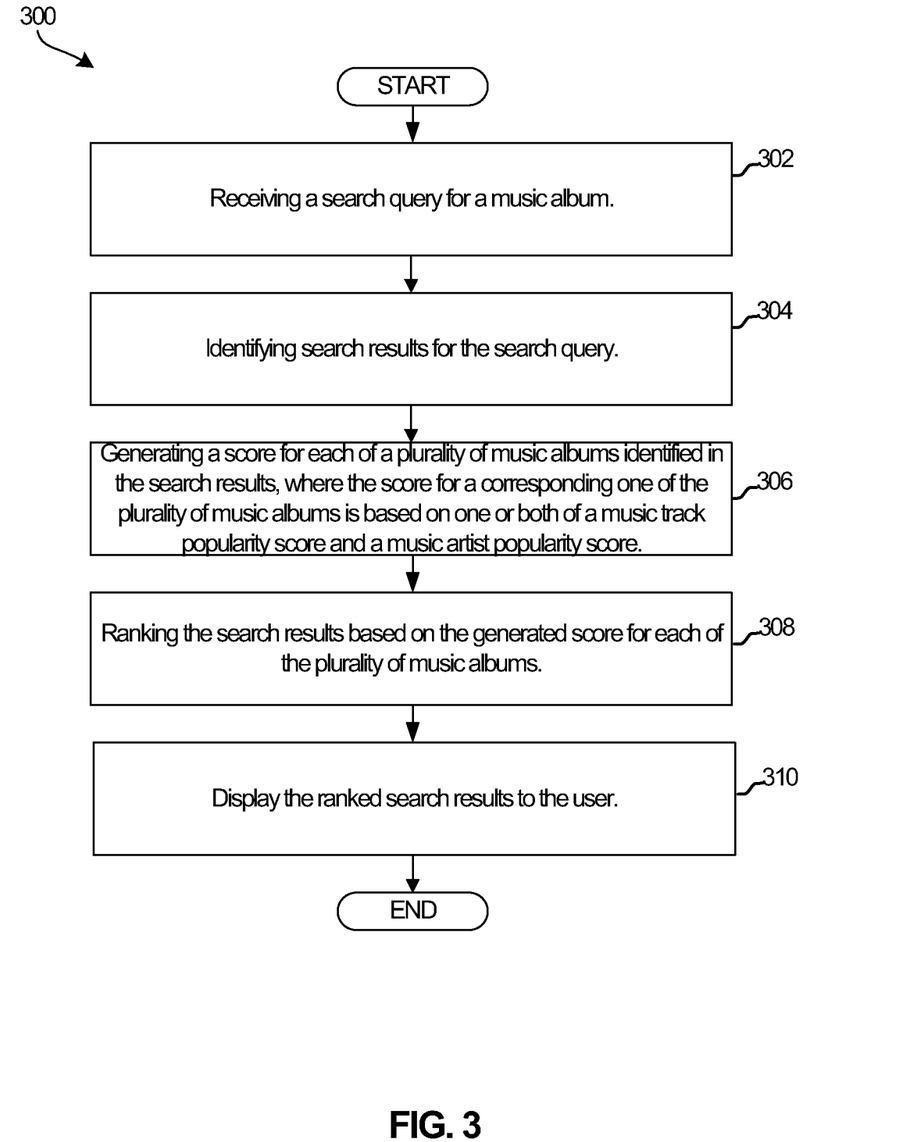
FIG. 3 is a flow chart illustrating example steps of a method for retrieving information in response to a search query for a music album, in accordance with an example embodiment of the disclosure.

FIG. 3 is a flow chart illustrating example steps of a method for retrieving information in response to a search query for a music album, in accordance with an example embodiment of the disclosure. Referring to FIGS. 1A-1B and 3, the example method 300 may start at 302 when the search engine 102 may receive a search query 124 for a music album. At 304, the search engine 102 may use the raw music database 104 to identifying search results for the search query. More specifically, album-related data (e.g., documents D1, . . . , Dn) may be identified as the search results (using the album data module 114) and communicated to the search engine ranker 108.

At 306, the search engine 102 may generate a ranking score (e.g., 126, . . . , 128) for each of a plurality of music albums identified in the search results (e.g., documents 130), based on one or both of a music track popularity score and a music artist popularity score (as well as any other query-independent score).

More specifically, the search query 124 may be for a specific music album name. The returned search results (e.g., documents 130) may identify a plurality of different albums with the same or similar name as in the search query 124. For each of the albums in the search results, the popularity engine 106 may obtain artist information from the artist data module 112, and track information for each album from the track data module 116. Subsequently, for a given album, an album popularity score may be calculated by the album popularity module 120, based on a popularity score for the album and/or based on a weighted average of track popularity scores for all tracks within the album (the track popularity scores for all tracks within the given album may be received from the track popularity module 122). The album popularity score for each album in the search results 130 may also be augmented by a popularity score for the corresponding music artist that recorded the specific album (the calculation of the artist popularity score is described herein above in reference to FIG. 2), as well as by other query-independent scores.

At 308, the search results 130 may be ranked based on the final ranking scores 126, . . . , 128 of the search results (e.g., documents D1, . . . , Dn) generated by the search engine 102. At 310, the ranked search results may be displayed to the user 101.

Figure 4:
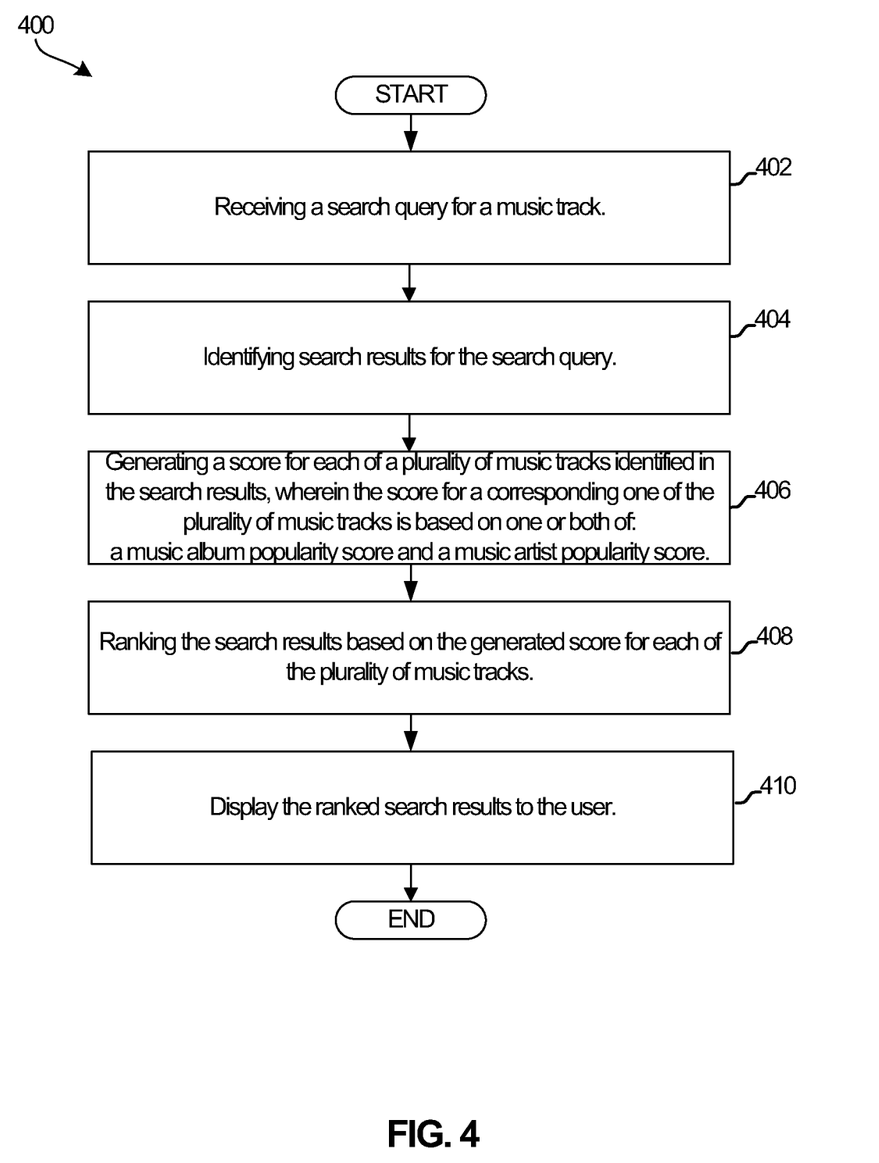
FIG. 4 is a flow chart illustrating example steps of a method for retrieving information in response to a search query for a music track, in accordance with an example embodiment of the disclosure.

FIG. 4 is a flow chart illustrating example steps of a method for retrieving information in response to a search query for a music track, in accordance with an example embodiment of the disclosure. Referring to FIGS. 1A-1B and 4, the example method 400 may start at 402 when the search engine 102 may receive a search query 124 for a music track. At 404, the search engine 102 may use the raw music database 104 to identifying search results for the search query. More specifically, track-related data (e.g., documents D1, . . . , Dn) may be identified as the search results (using the track data module 116) and communicated to the search engine ranker 108.

At 406, the search engine 102 may generate a ranking score (e.g., 126, . . . , 128) for each of a plurality of music tracks identified in the search results (e.g., documents 130), based on one or both of a music album popularity score and a music track popularity score (which are query independent scores), as well as other query independent scores.

More specifically, the search query 124 may be for a specific music track name. The returned search results (e.g., documents 130) may identify a plurality of different tracks with the same or similar name as in the search query 124. For each of the tracks in the search results, the popularity engine 106 may obtain artist information from the artist data module 112, and album information for the album of the track from the album data module 116. Subsequently, for a given music track, a track popularity score may be calculated by the track popularity module 122. The track popularity score for each track in the search results 130 may also be augmented by a popularity score of a corresponding music album (as described above in reference to FIG. 3), and/or by a popularity score for the corresponding music artist that recorded the specific album (the calculation of the artist popularity score is described herein above in reference to FIG. 2).

At 408, the search results 130 may be ranked based on the final ranking scores 126, . . . , 128 of the search results (e.g., documents D1, . . . , Dn) generated by the search engine 102. At 410, the ranked search results may be displayed to the user 101.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for retrieving information.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for retrieving information, comprising:
receiving, in a non-WWW corpus, a search query for a media author;
identifying, within the non-WWW corpus, search results for the search query;
generating a score for each of a plurality of media authors identified in the search results, wherein:
the score for a corresponding one of the plurality of media authors is based on a combined media popularity score for a plurality of media items authored by the corresponding one of the plurality of media authors and further based on at least another score that is independent of the search query and based at least in part on a geographic location from which the search query is received and on a language used in the geographic location;
identifying two of the plurality of media items with an identical title, wherein, when the two media items with the identical title are identified, the at least another score is higher for the media item that is more closely associated with the geographic location and the language than the other of the two media items;
ranking the search results based on the score for each of the plurality of media authors; and
displaying the ranked search results to the user.

2. A method for retrieving information, comprising:
receiving, in a non-WWW corpus, a search query for a media author;
identifying, within the non-WWW corpus, search results for the search query;
generating a score for each of a plurality of music artists identified in the search results, wherein:
the score for a corresponding one of the plurality of music artists is based on a combined music album popularity score for a plurality of music albums of the corresponding one of the plurality of music artists and further based on at least another score that is independent of the search query and based at least in part on a geographic location from which the search query is received and on a language used in the geographic location;
identifying two of the plurality of music albums with an identical title, wherein, when the two music albums with the identical title are identified, the at least another score is higher for the music album that is more closely associated with the geographic location and the language than the other of the two music albums;
ranking the search results based on the score for each of the plurality of music artists; and
displaying the ranked search results to the user.

3. The method according to claim 2, comprising:
receiving identifying information for the plurality of music albums.

4. The method according to claim 3, comprising:
receiving identifying information for a plurality of music tracks within each of the plurality of music albums.

5. The method according to claim 4, comprising:
determining a popularity score for each of the plurality of music tracks, wherein the popularity score for a corresponding music track is based on one or both of a total number of search queries for the corresponding music track and clickthrough ratios (CTRs) of web results from the search queries.

6. The method according to claim 5, wherein at least a portion of the total number of search queries for the music track are performed in a World Wide Web (WWW)-based search corpus.

7. The method according to claim 5, comprising: determining a popularity score for each of the plurality of music albums, wherein the popularity score for a corresponding music album is based on a weighted average of the popularity score for each of the plurality of music tracks within the corresponding music album.

8. The method according to claim 7, comprising:
generating the combined music album popularity score as a weighted average of the popularity score for each of the plurality of music albums.

9. The method according to claim 2, wherein the at least another score independent of the search query is further based on one or more of:
a release date of at least one of the plurality of music albums;
a play count of at least one of the plurality of music albums; and
a sell count of at least one of the plurality of music albums.

10. A system for retrieving information, comprising:
a network device comprising at least one processor coupled to memory, wherein the processor performs operations to:
receive a search query for a music artist;
identify search results for the search query;
generate a score for each of a plurality of music artists identified in the search results, wherein:
the score for a corresponding one of the plurality of music artists is based on a combined music album popularity score for a plurality of music albums of the corresponding one of the plurality of music artists and further based on at least another score that is independent of the search query and based at least in part on a geographic location from which the search query is received and on a language used in the geographic location;
identify two of the plurality of music albums with an identical title, wherein, when the two music albums with the identical title are identified, the at least another score is higher for the music album that is more closely associated with the geographic location and the language than the other of the two music albums;
rank the search results based on the score for each of the plurality of music artists; and
display the ranked search results to the user.

11. The system according to claim 10, wherein the processor performs operations to:
receive identifying information for the plurality of music albums.

12. The system according to claim 11, wherein the processor performs operations to:
receive identifying information for a plurality of music tracks within each of the plurality of music albums.

13. The system according to claim 12, wherein the processor performs operations to:
determine a popularity score for each of the plurality of music tracks, wherein the popularity score for a corresponding music track is based on one or both of a total number of search queries for the corresponding music track and clickthrough ratios (CTRs) of web results from the search queries.

14. The system according to claim 13, wherein at least a portion of the total number of search queries for the music track are performed in a World Wide Web (WWW)-based search corpus.

15. The system according to claim 13, wherein the processor performs operations to:
determine a popularity score for each of the plurality of music albums, wherein the popularity score for a corresponding music album is based on a weighted average of the popularity score for each of the plurality of music tracks within the corresponding music album.

16. The system according to claim 15, wherein the processor performs operations to:
generate the combined music album popularity score as a weighted average of the popularity score for each of the plurality of music albums.

17. The system according to claim 10, wherein the at least another score independent of the search query is further based on one or more of:
a release date of at least one of the plurality of music albums;
a play count of at least one of the plurality of music albums; and
a sell count of at least one of the plurality of music albums.

18. A method for retrieving information, comprising:
receiving a search query for a music album;
identifying search results for the search query;
generating a score for each of a plurality of music albums identified in the search results, wherein the score for a corresponding one of the plurality of music albums is based on one or both of:
a music track popularity score for at least one music track from the corresponding one of the plurality of music albums; and
a music artist popularity score for a music artist associated with the corresponding one of the plurality of music albums; and
is further based on at least another score that is independent of the search query and based at least in part on a geographic location from which the search query is received and on a language used in the geographic location;
identify two of the plurality of music albums with an identical title, wherein, when the two music albums with the identical title are identified, the at least another score is higher for the music album that is more closely associated with the geographic location and the language than the other of the two music albums;
ranking the search results based on the generated score for each of the plurality of music albums; and
displaying the ranked search results to the user.

* * * * *